US011958547B2

(12) United States Patent
Ishihara

(10) Patent No.: US 11,958,547 B2
(45) Date of Patent: Apr. 16, 2024

(54) STEERING DEVICE

(71) Applicant: Knorr-Bremse Commercial Vehicle Systems Japan Ltd., Sakado (JP)

(72) Inventor: Takuya Ishihara, Kumagaya (JP)

(73) Assignee: Knorr-Bremse Commercial Vehicle Systems Japan Ltd., Saitama (JP)

( * ) Notice: Subject to any disclaimer, the term of this patent is extended or adjusted under 35 U.S.C. 154(b) by 557 days.

(21) Appl. No.: 17/273,419

(22) PCT Filed: Aug. 22, 2019

(86) PCT No.: PCT/JP2019/032819
§ 371 (c)(1),
(2) Date: Mar. 4, 2021

(87) PCT Pub. No.: WO2020/059403
PCT Pub. Date: Mar. 26, 2020

(65) Prior Publication Data
US 2021/0188347 A1    Jun. 24, 2021

(30) Foreign Application Priority Data

Sep. 19, 2018 (JP) .................................. 2018-175044

(51) Int. Cl.
*B62D 5/24* (2006.01)
*B62D 5/14* (2006.01)
*B62D 5/083* (2006.01)
*B62D 5/18* (2006.01)

(52) U.S. Cl.
CPC .................. *B62D 5/24* (2013.01); *B62D 5/14* (2013.01); *B62D 5/083* (2013.01); *B62D 5/18* (2013.01)

(58) Field of Classification Search
CPC ............... B62D 5/22; B62D 5/24; B62D 5/14
See application file for complete search history.

(56) References Cited

U.S. PATENT DOCUMENTS

| 10,370,028 B2* | 8/2019 | Matsumura ............. B62D 5/14 |
| 2017/0096160 A1 | 4/2017 | Yoda et al. |
| 2019/0052154 A1 | 2/2019 | Sugiura |

FOREIGN PATENT DOCUMENTS

| CN | 104401388 A | 3/2015 |
| JP | H04-159176 A | 6/1992 |
| JP | 2008-195108 A | 8/2008 |
| JP | 2009-220621 A | 10/2009 |
| JP | 2016-150645 A | 8/2016 |

(Continued)

OTHER PUBLICATIONS

International Search Report issued in corresponding application No. PCT/JP2019/032819 dated Oct. 8, 2019, with English translation.

(Continued)

*Primary Examiner* — Kevin Hurley
(74) *Attorney, Agent, or Firm* — FOLEY & LARDNER LLP

(57) ABSTRACT

In a steering device of the present invention, an electric motor rotates a steering shaft through a reduction mechanism, and the reduction mechanism and a torque sensor are accommodated in an integrally-structured housing. With this, the present invention can provide a steering device that is capable of suppressing increase in size of the electric motor.

15 Claims, 9 Drawing Sheets

(56) References Cited

FOREIGN PATENT DOCUMENTS

| JP | 2017-143203 A | 8/2017 |
|----|---------------|--------|
| JP | 2017-171071 A | 9/2017 |
| WO | WO-2015/102554 A1 | 7/2015 |
| WO | WO-2015/141255 A1 | 9/2015 |
| WO | WO-2018/055806 A1 | 3/2018 |

OTHER PUBLICATIONS

Written Opinion issued in corresponding application No. PCT/JP2019/032819 dated Oct. 8, 2019, with English translation.

* cited by examiner

STEERING DEVICE

TECHNICAL FIELD

The present invention relates to a steering device.

BACKGROUND ART

Patent Document 1 discloses a steering device having a hydraulic first power steering mechanism and an electric second power steering mechanism.

CITATION LIST

Patent Document

Patent Document 1: Japanese Unexamined Patent Application Publication No. JP2016-150645

SUMMARY OF THE INVENTION

Technical Problem

In the above conventional steering device, since an electric motor directly rotates a steering shaft, there is a risk that size of the electric motor will be increased.

An object of the present invention is therefore to provide a steering device that is capable of suppressing increase in size of the electric motor.

Solution to Problem

According to one aspect of the present invention, an electric motor rotates a steering shaft through a reduction mechanism, and the reduction mechanism and a torque sensor are accommodated in an integrally-structured housing.

Effects of Invention

Therefore, increase in size of the electric motor can be suppressed. Also, a structure can be simplified, and increase in size, in a direction of a rotation axis of the steering shaft, can be suppressed.

That is, in a case where the housing is formed by two members, a bolt, a nut, a bolt flange, a sealing structure, etc. are needed to connect these two members.

EMBODIMENTS FOR CARRYING OUT THE INVENTION

Embodiments for carrying out the present invention will be explained below with reference to the drawings.

Embodiment 1

Figure 1:
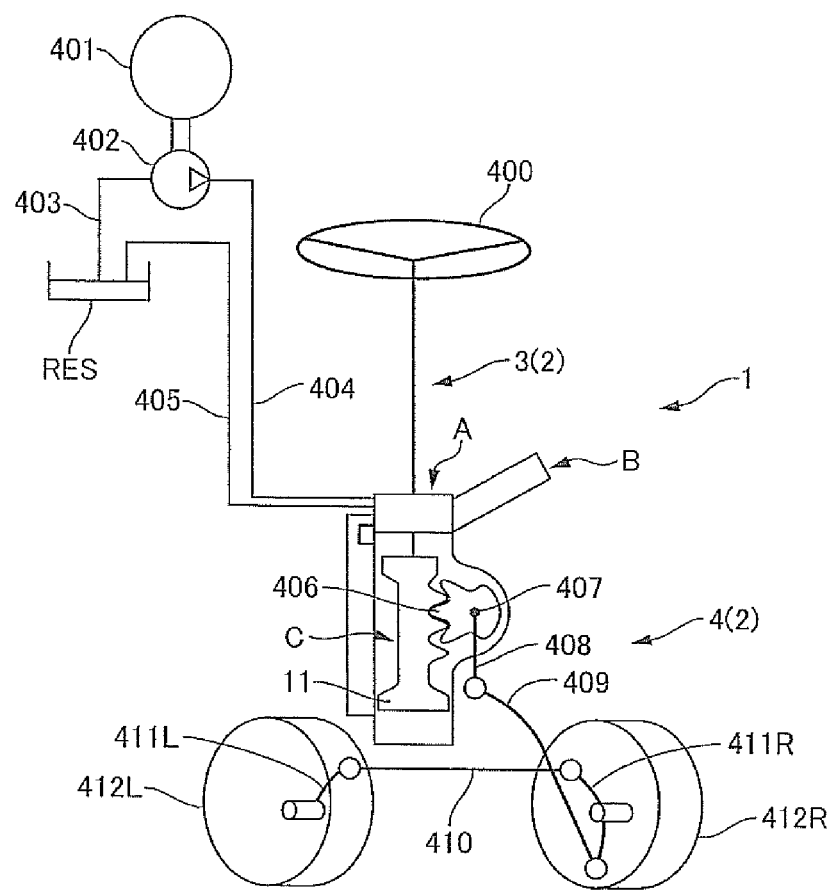
FIG. 1 is a schematic diagram showing a configuration of a steering system to which a steering device 1 according to an embodiment 1 of the present invention is applied.

FIG. 1 is a schematic diagram showing a configuration of a steering system to which a steering device 1 according to an embodiment 1 is applied.

The steering device 1 has, as a steering mechanism 2, a steering shaft 3 and a transmission mechanism 4. The steering shaft 3 has a steering wheel 400 that is operated by a driver. The steering shaft 3 inputs a rotation force (a steering torque) by a steering operation of the steering wheel 400 by the driver. The steering shaft 3 rotates by and according to the steering operation. Further, the steering shaft 3 transmits a steering reaction force to the driver.

The rotation force (the steering torque) of the steering shaft 3 is transmitted to a gear mechanism C.

The gear mechanism C is a ball-nut type mechanism. The details will be described later.

A piston 11 of the gear mechanism C moves in up and down directions in the drawing, then a sector gear 406 rotates.

The transmission mechanism 4 has a sector shaft 407, a pitman arm 408, a drag link 409 and a tie rod 410.

The sector shaft 407 is fixed to the sector gear 406.

The sector shaft 407 extends coaxially with the sector gear 406, and rotates integrally with the sector gear 406.

The pitman arm 408 is connected to the sector shaft 407 and the drag link 409.

The drag link 409 is connected to the pitman arm 408 and a knuckle arm 411R of one steered wheel 412R.

Regarding the tie rod 410, for instance, in a case of a rigid axle suspension, the tie rod 410 is connected to knuckle arms 411L and 411R of both steered wheels 412L and 412R.

The pitman arm 408 transmits rotation of the sector shaft 407 to the knuckle arm 411R through the drag link 409. Movement transmitted to the knuckle arm 411R is transmitted to the knuckle arm 411l, of the other steered wheel 412L through the tie rod 410.

The steering device 1 has a first power steering mechanism A and a second power steering mechanism B.

The first power steering mechanism A has a pump device 402, the piston 11 and a rotary valve 39.

That is, although its detailed configuration will be described later, the first power steering mechanism A is an integral type mechanism in which the piston 11 and the rotary valve 39 are configured integrally with the gear mechanism C.

The first power steering mechanism A is a hydraulic power steering mechanism using a hydraulic pressure produced by the pump device 402. As a working fluid, e.g. a power steering fluid (PSF) is used.

The pump device 402 is a hydraulic pressure source that discharges the working fluid. The pump device 402 is provided outside the gear mechanism C.

An inlet side of the pump device 402 is connected to a reservoir tank RES provided outside the gear mechanism C through a pipe (a fluid passage) 403.

An outlet side of the pump device 402 is connected to the after-mentioned rotary valve 39 through a pipe (a fluid passage) 404.

The pump device 402 is controlled and driven by a drive source 401 such as an engine or an electric motor.

The second power steering mechanism B is an electric power steering mechanism directly using power of an after-mentioned electric motor 7 as a steering assist force. Its detailed configuration will be described later.

Figure 2:
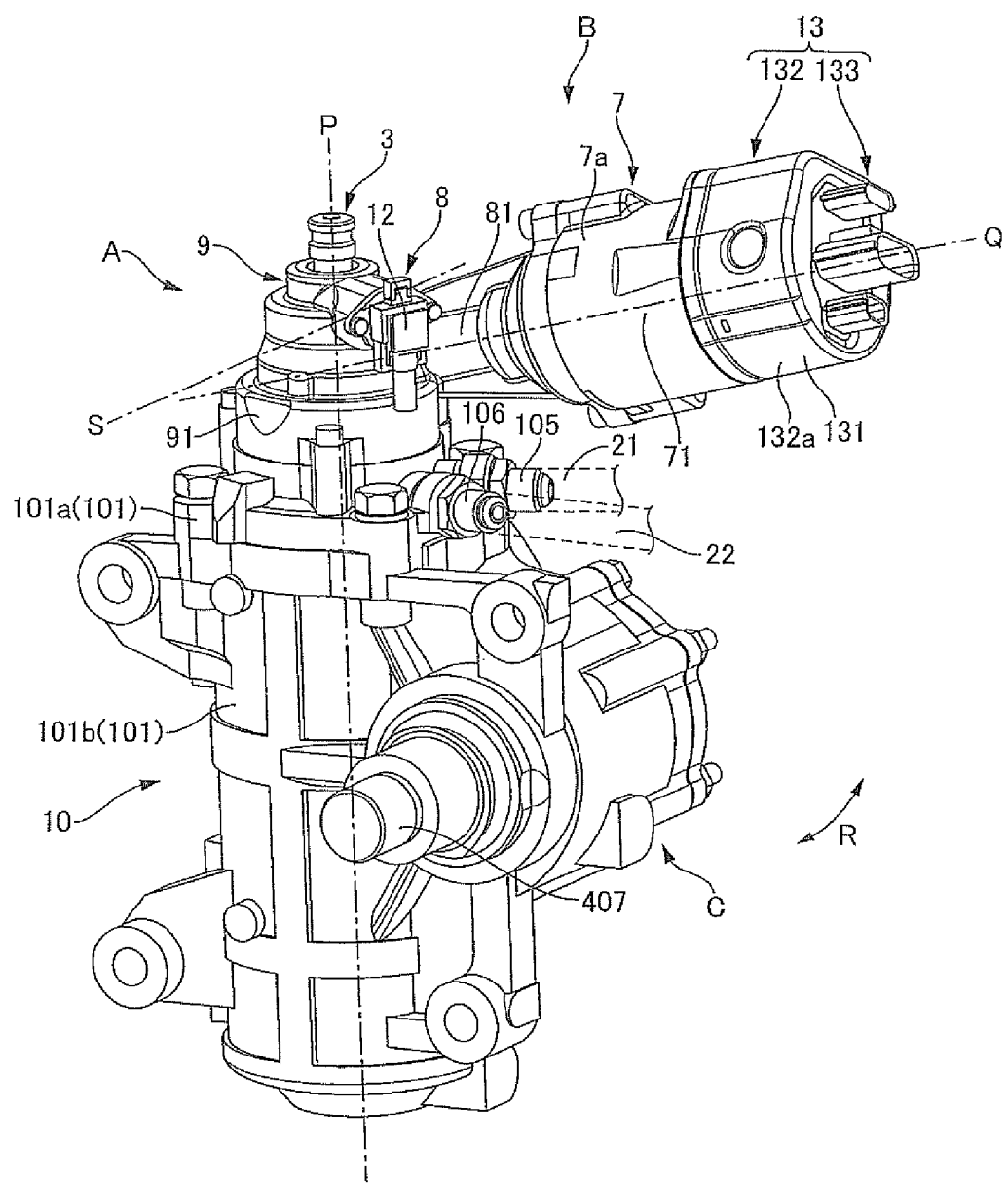
FIG. 2 is a perspective view of a first power steering mechanism A and a second power steering mechanism B of the embodiment 1.

FIG. 2 is a perspective view of the steering device 1 having the first power steering mechanism A, the second power steering mechanism B and the gear mechanism C according to the embodiment 1.

The second power steering mechanism B is configured from a worm shaft 81 of a worm gear 8 as a speed reducer (or a reduction gear) accommodated in a first housing body 91 of a first housing 9, the electric motor 7 having an electric motor output shaft 71 coaxially connected to the worm shaft 81 and a control unit 13.

The control unit 13 has a control unit body 132 and a power supply connector portion 133. The control unit body 132 includes a control unit body-housing 132a accommodating therein a microprocessor 131.

This microprocessor 131 generates a motor command signal sent to the electric motor 7 on the basis of a steering torque signal sent from a torque sensor 12.

Here, the worm shaft 81, the electric motor 7, the control unit body-housing 132a and the power supply connector portion 133 are arranged in a direction of a rotation axis Q of the worm shaft 81 in the order of the worm shaft 81, the electric motor 7, the control unit body-housing 132a and the power supply connector portion 133.

By arranging these components along the direction of the rotation axis Q of the worm shaft 81 in this way, a protruding amount of the second power steering mechanism B in a radial direction of the rotation axis Q of the worm shaft 81 is suppressed, then mountability of the steering device 1 into a vehicle can be improved.

A working fluid supply pipe 21 for supplying the working fluid to the after-mentioned rotary valve 39 provided in the first power steering mechanism A is connected to a working fluid supply port 105 provided at a second housing 10.

Further, a working fluid discharge pipe 22 for discharging the working fluid, which is discharged from the rotary valve 39 provided in the first power steering mechanism A, to an outside of the first power steering mechanism A is connected to a working fluid discharge port 106 provided at the second housing 10.

These working fluid supply port 105 and working fluid discharge port 106 are provided so as to protrude to the same side (a right side in the drawing) as the electric motor 7 with respect to an axis S that connects a meshing portion of the worm shaft 81 with an after-mentioned worm wheel 82 and the steering shaft 3 on a plane orthogonal to a rotation axis P of the steering shaft 3.

With this arrangement, it is possible to suppress expansion of an occupied area of the whole steering device with respect to the vehicle.

Further, the worm shaft 81 is offset from the working fluid supply port 105 and the working fluid discharge port 106 (in a direction of an arrow R) in a circumferential direction of the rotation axis P of the steering shaft 3 so as not to interfere with the working fluid supply port 105 and the working fluid discharge port 106.

With this arrangement, it is possible to improve workability of connecting work for connecting the working fluid supply pipe 21 and the working fluid discharge pipe 22 to the working fluid supply port 105 and the working fluid discharge port 106 respectively.

In addition, the worm shaft 81 can be prevented from interfering with the working fluid supply port 105 and the working fluid discharge port 106.

Furthermore, the worm shaft 81 meshes with the worm wheel 82 obliquely to a plane perpendicular to a rotation axis P of the worm wheel 82 (which is the same as the rotation axis P of the steering shaft 3).

That is, as shown in FIG. 2, the power supply connector portion 133 side of the second power steering mechanism B inclines upward.

By this oblique arrangement of the worm shaft 81, a layout in which the worm shaft 81 can be prevented from interfering with the working fluid supply port 105 and the working fluid discharge port 106 can be easily employed.

Figure 3:
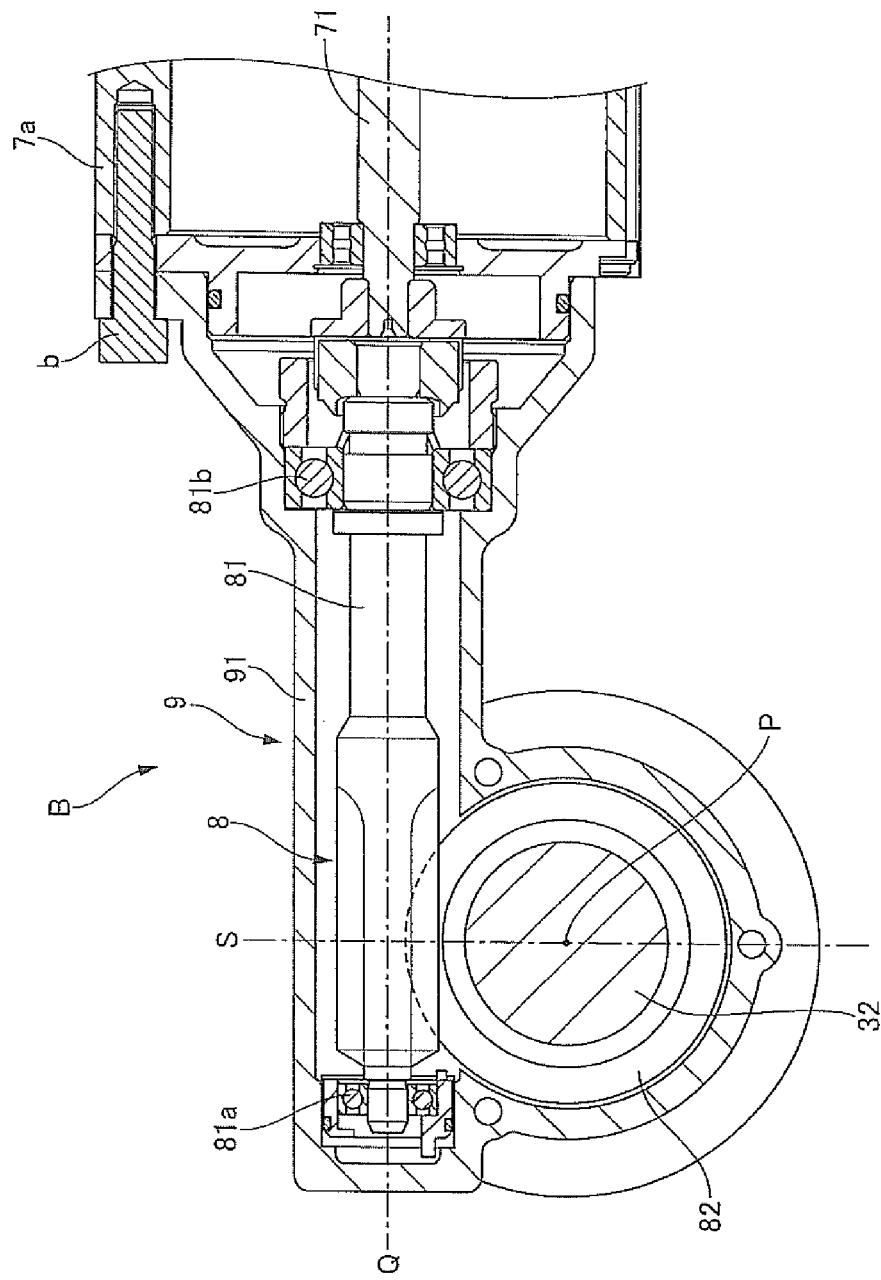
FIG. 3 is a local sectional view of the second power steering mechanism B of the embodiment 1.

FIG. 3 is a local sectional view of the second power steering mechanism B of the embodiment 1.

The worm shaft 81 coaxially connected to the electric motor output shaft 71 is accommodated in the first housing body 91, and is supported by a pair of bearings 81a and 81b.

The worm shaft 81 meshes with the worm wheel 82 provided at a second shaft 32 of the steering shaft 3, which forms the worm gear 8 as the speed reducer (or the reduction gear).

Here, the first housing body 91 and an electric motor housing 7a are fixed together with a plurality of bolts b.

Figure 4:
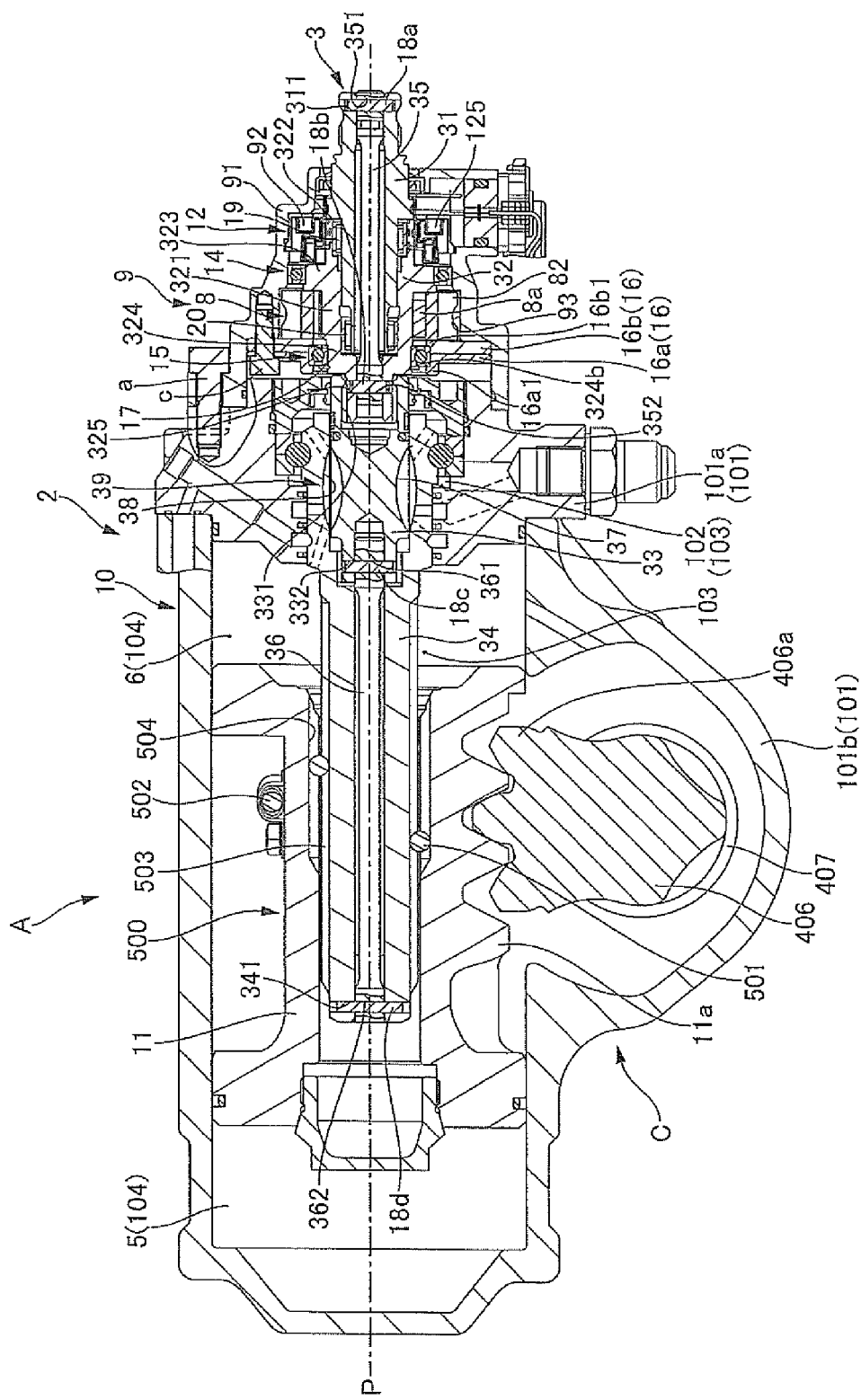
FIG. 4 is a sectional view of the first power steering mechanism A of the embodiment 1.
Figure 5:
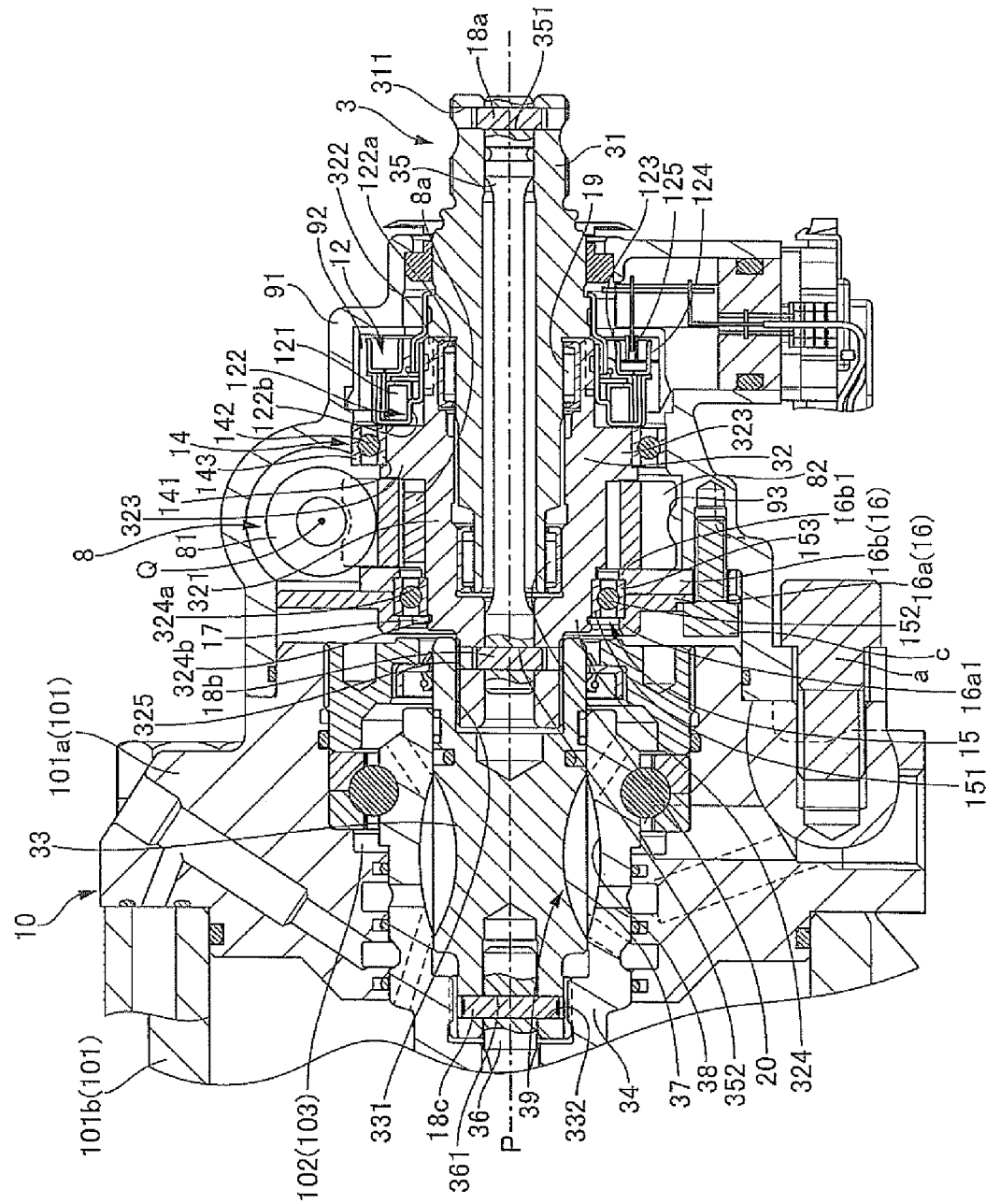
FIG. 5 is an enlarged local sectional view of the first power steering mechanism A of the embodiment 1.
Figure 6B:
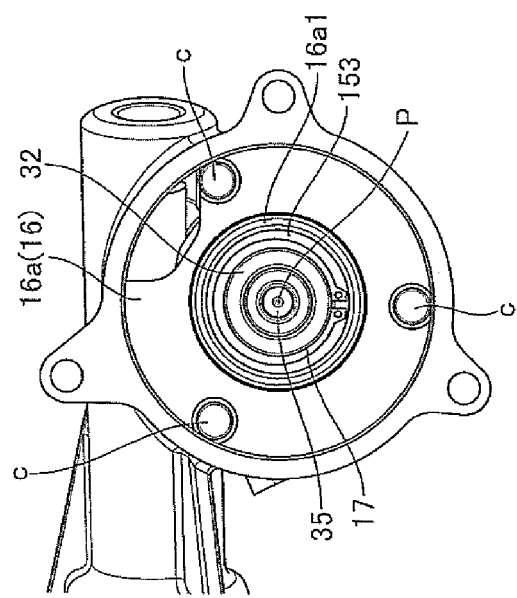
FIG. 6B is a front view of the plate 16 viewed from opening side, located at a second housing 10 side, of a first housing 9.
Figure 6A:
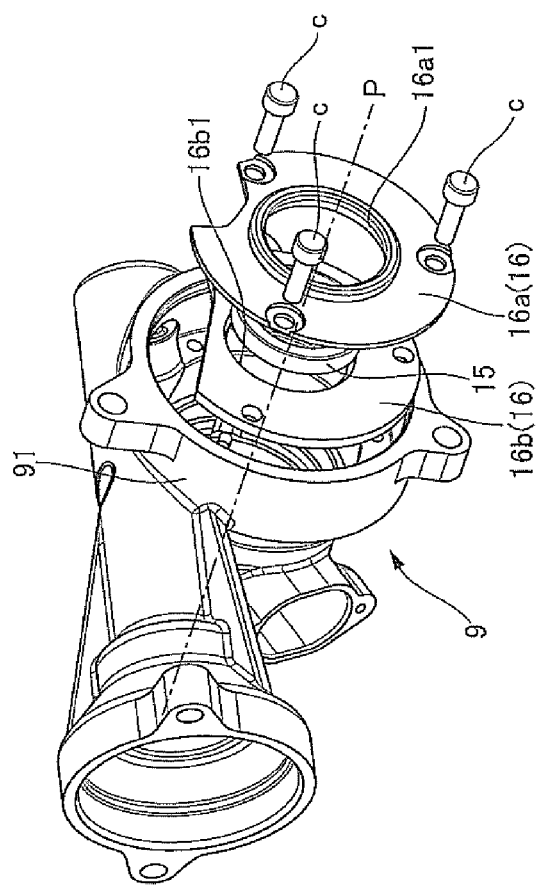
FIG. 6A is a perspective exploded view of a plate 16 of the embodiment 1.
Figure 7B:
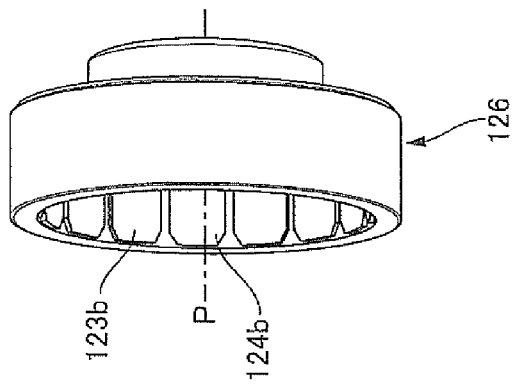
FIG. 7B is a perspective view showing a state in which the first yoke 123, the second yoke 124 and the yoke retaining member 126 are assembled.
Figure 7A:
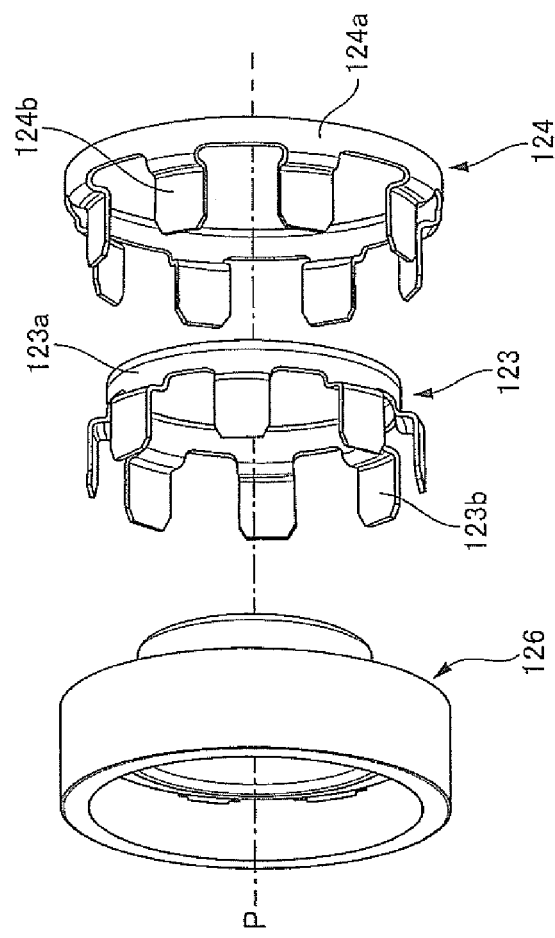
FIG. 7A is a perspective exploded view of a first yoke 123, a second yoke 124 and a yoke retaining member 126 of the embodiment 1.
Figure 8A:
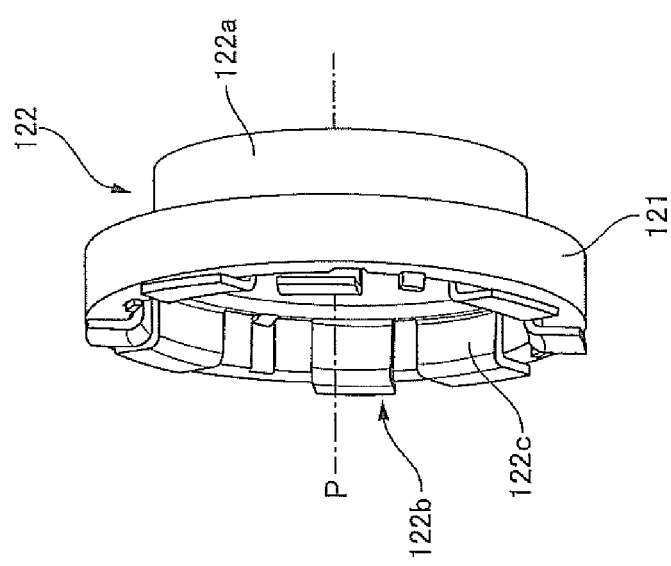
FIG. 8A is a perspective view showing a state in which a magnet 121 and a magnet retaining member 122 of the embodiment 1 are assembled.
Figure 8B:
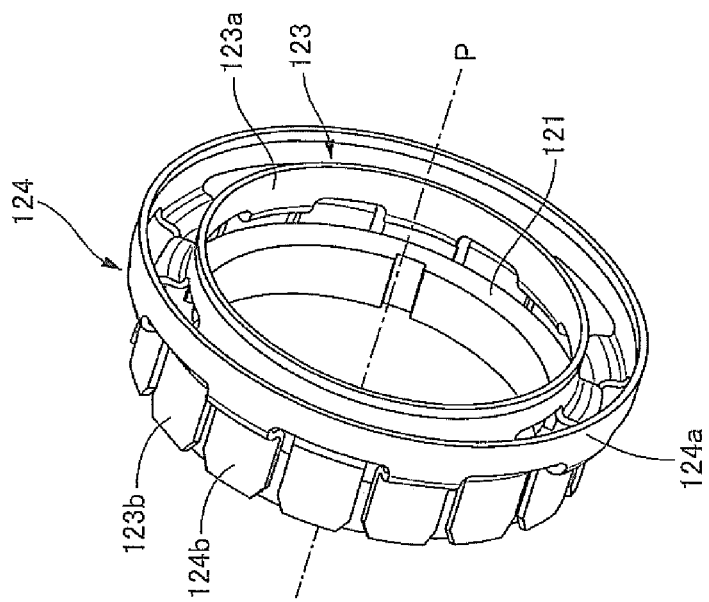
FIG. 8B is a perspective view showing a positional relationship of the magnet 121, the first yoke 123 and the second yoke 124 of the embodiment 1.

FIG. 4 is a sectional view of the first power steering mechanism A of the embodiment 1. FIG. 5 is an enlarged local sectional view of the first power steering mechanism A of the embodiment 1. FIG. 6A is a perspective exploded view of a plate 16 of the embodiment 1. FIG. 6B is a front view of the plate 16 viewed from opening side, located at the second housing 10 side, of the first housing 9. FIG. 7A is a perspective exploded view of a first yoke 123, a second yoke 124 and a yoke retaining member 126 of the embodiment 1. FIG. 7B is a perspective view showing a state in which the first yoke 123, the second yoke 124 and the yoke retaining member 126 are assembled. FIG. 5A is a perspective view showing a state in which a magnet 121 and a magnet retaining member 122 of the embodiment 1 are assembled. FIG. 8B is a perspective view showing a positional relationship of the magnet 121, the first yoke 123 and the second yoke 124 of the embodiment 1.

First, a configuration will be explained with reference to FIGS. 4 and 5.

The steering shaft 3 has a first shaft 31, the second shaft 32, a third shaft 33, a fourth shaft 34, a first torsion bar 35 and a second torsion bar 36.

In FIG. 4, at a right direction side, in the direction of the rotation axis P, of the first shaft 31, the steering wheel 400 is connected. The first shaft 31 inputs the rotation force (the steering torque) by the steering operation of the steering wheel 400 by the driver. The first shaft 31 rotates by and according to the steering operation. Further, the first shaft 31 transmits the steering reaction force to the driver.

The first shaft 31 and the second shaft 32 are connected to each other through the first torsion bar 35.

That is, the first shaft 31 has, at a right direction end portion thereof in the drawing, a first shaft-radial direction hole portion 311 formed along a radial direction of the rotation axis P of the steering shaft 3. The first torsion bar 35 has, at a right direction end portion thereof in the drawing, a first torsion bar radial direction hole portion 351 formed along the radial direction of the rotation axis P of the steering shaft 3.

A fixing pin 18a is inserted into both of the first shaft-radial direction hole portion 311 and the first torsion bar radial direction hole portion 351, then the first shaft 31 and the first torsion bar 35 are connected.

Further, the second shaft 32 has, at a left direction end portion thereof in the drawing, a second shaft-radial direction hole portion 325 as a first torsion bar connecting portion formed along the radial direction of the rotation axis P of the steering shaft 3. The first torsion bar 35 has, at a left direction end portion thereof in the drawing, a first torsion bar radial direction hole portion 352 as a second shaft connecting portion formed along the radial direction of the rotation axis P of the steering shaft 3.

A fixing pin 18b is inserted into both of the second shaft-radial direction hole portion 325 and the first torsion bar radial direction hole portion 352, then the second shaft 32 and the first torsion bar 35 are connected.

Between an outer peripheral surface of the first shaft 31 and an inner peripheral surface of the second shaft 32, a needle bearing 19 as a third bearing and a needle bearing 20 as a fourth bearing are arranged apart from each other in the direction of the rotation axis P of the steering shaft 3, and rotatably support the first shaft 31 and the second shaft 32.

The third shaft 33 has, at a right direction end portion thereof in the direction of the rotation axis P of the steering shaft 3 in the drawing, a second shaft insertion hole portion 331 opening toward the second shaft 32 in the direction of the rotation axis P of the steering shaft 3 and having an inner peripheral surface where serrations are formed. The left direction end portion, in the direction of the rotation axis P of the steering shaft 3 in the drawing, having an outer peripheral surface where serrations are formed, of the second shaft 32 is inserted into the second shaft insertion hole portion 331, then the second shaft 32 and the third shaft 33 are connected.

Here, a portion (the second shaft-radial direction hole portion 325, the fixing pin 18b and the first torsion bar radial direction hole portion 352) where the second shaft 32 and the first tors ion bar 35 are connected overlaps the second shaft insertion hole portion 331 in the direction of the rotation axis P of the steering shaft 3. With this overlapping arrangement, it is possible to suppress increase in axial direction size of the steering device 1.

The third shaft 33 and the fourth shaft 34 are connected to each other through the second torsion bar 36.

That is, the third shaft 33 has, at a left direction end portion thereof in the drawing, a third shaft-radial direction hole portion 332 formed along the radial direction of the rotation axis P of the steering shaft 3. The second torsion bar 36 has, at a right direction end portion thereof in the drawing, a second torsion bar radial direction hole portion 361 formed along the radial direction of the rotation axis P of the steering shaft 3.

A fixing pin 18c is inserted into both of the third shaft-radial direction hole portion 332 and the second torsion bar radial direction hole portion 361, then the third shaft 33 and the second torsion bar 36 are connected.

Further, as shown in FIG. 4, the fourth shaft 34 has, at a left direction end portion thereof, a fourth shaft-radial direction hole portion 341 formed along the radial direction of the rotation axis P of the steering shaft 3. The second torsion bar 36 has, at a left direction end portion thereof in the drawing, a second torsion bar radial direction hole portion 362 formed along the radial direction of the rotation axis P of the steering shaft 3.

A fixing pin 18d is inserted into both of the fourth shaft-radial direction hole portion 341 and the second torsion bar radial direction hole portion 362, then the fourth shaft 34 and the second tors ion bar 36 are connected.

The first housing 9 has the first housing body 91, a sensor accommodating space 92 and a reduction gear accommodating space 93.

The first housing body 91 is formed as a single-piece member by molding.

Therefore, a structure of the first housing 9 can be simplified, and increase in size of the first housing 9 in the direction of the rotation axis P of the steering shaft 3 can be suppressed. That is, in a case where the first housing 9 is formed by two members, a bolt, a nut, a bolt boss (a flange), a sealing structure, etc. are needed to connect these two members, and this consequently causes increase in size.

The sensor accommodating space 92 is provided at an inner side of the first housing body 91, and accommodates the torque sensor 12.

The reduction gear accommodating space 93 is provided at the inner side of the first housing body 91, and accommodates the worm gear 8 as the speed reducer (or the reduction gear).

The second shaft 32 further has a second shaft-torque sensor retaining portion 322 to retain (or support) the torque sensor 12, a second shaft-first bearing retaining portion 323 to retain (or support) a first ball bearing 14 as a first bearing and a reduction gear fixing portion 321.

An outside diameter, in the radial direction of the rotation axis P of the steering shaft 3, of the second shaft-first bearing retaining portion 323 is formed to be greater than an outside diameter, in the radial direction of the rotation axis P of the steering shaft 3, of the second shaft-torque sensor retaining portion 322.

With this, since the first ball bearing 14 has an inside diameter that is greater than the outside diameter of the second shaft-torque sensor retaining portion 322 of the second shaft 32, it is possible to sufficiently secure a capacity of load which the first ball bearing 14 receives.

The reduction gear fixing portion 321 is located between the first ball bearing 14, as the first bearing, having a first inner race 141, balls 142 and a first outer race 143 and a second ball bearing 15, as a second bearing, having a second inner race 151, balls 152 and a second outer race 153 in the direction of the rotation axis P of the steering shaft 3.

With this, it is possible to suppress fall-down or leaning of the second shaft 32 with respect to the first housing 9, and also suppress fall-down or leaning of the third shaft 33 that is connected to the second shaft 32. Further, since the third shaft 33 is provided with a third shaft valve portion 37 that forms the rotary valve 39, an influence on operating characteristics of the rotary valve 39 due to the fall-down of the third shaft 33 can also be suppressed.

The worm wheel 82 of the worm gear 8 is fixed to the reduction gear fixing portion 321 through a key 8a.

The first ball bearing 14 is provided at the first housing body 91 of the first housing 9. The first ball bearing 14 supports the second shaft 32 with the first outer race 143 being fixed to the first housing body 91 and the first inner race 141 being fixed to the second shaft-first bearing retaining portion 323 of the second shaft 32.

Here, the first ball bearing 14 is located between the two needle bearings 19 and 20.

With this, the first shaft 31 and the second shaft 32 can be supported with respect to the first housing 9 with a good balance.

The second ball bearing 15 is provided at the first housing body 91 of the first housing 9. The second ball bearing 15 is spaced apart from the first ball bearing 14 in the direction of the rotation axis P of the steering shaft 3, and supports the second shaft 32 with respect to the first housing 9.

Here, the torque sensor 12, the first ball bearing 14 and the worm gear 8 are arranged in the direction of the rotation axis P of the steering shaft 3 in the order of the torque sensor 12, the first ball bearing 14 and the worm gear 8.

With this arrangement, the first ball bearing 14 can receive a rotation force inputted to the second shaft 32 from the electric motor 7 through the worm gear 8 at a closer position with respect to the torque sensor 12. it is therefore possible to suppress fall-down or leaning and flexure of the second shaft 32, due to transmission of the rotation force from the electric motor 7, at the second shaft-torque sensor retaining portion 322 where the torque sensor 12 is provided, thereby suppressing decrease in detection accuracy of the torque sensor 12.

Fixing of the second ball bearing 15 as the second bearing to the first housing body 91 will be explained with reference to FIGS. 4 to 6.

The plate 16 formed from a first plate 16*a* and a second plate 16*b* is accommodated in the first housing body 91 at a closer position to the second housing 10 with respect to the worm gear 8 in the direction of the rotation axis P of the steering shaft 3, and is fixed to the first housing body 91 with three bolts c.

With this, for instance, in a case where the plate 16 is fixed with the plate 16 being sandwiched between the first housing 9 and the second housing 10, seals are needed between the first housing 9 and the plate 16 and between the plate 16 and the second housing 10. However, by accommodating the plate 16 in the first housing 9 in the manner of the present embodiment, the seal between the plate 16 and the first housing 9 is not required, thereby suppressing increase in parts count.

The first plate 16*a* and the second plate 16*b* have plate second bearing retaining portions 16*a*1 and 16*b*1 to retain (or support) the second ball bearing 15 respectively.

These plate second bearing retaining portions 16*a*1 and 16*b*1 sandwich the second outer race 153 of the second ball bearing 15 from both sides in the direction of the rotation axis P of the steering shaft 3, then retain the second ball bearing 15.

The second shaft 32 further has a second shaft-second bearing retaining portion 324 to retain (or support) the second ball bearing 15.

The second shaft-second bearing retaining portion 324 has a contact surface 324*a* that contacts one of a pair of end surfaces, in the direction of the rotation axis P of the steering shaft 3, of the second inner race 151. A C-ring 17 as a second inner race fixing member is fitted into a groove 324*b* formed at the second shaft 32, and contacts the other of the pair of end surfaces, in the direction of the rotation axis P of the steering shaft 3, of the second inner race 151, then fixes the second inner race 151 to the second shaft 32.

In this manner, the second ball bearing 15 is provided between the second shaft 32 and the plate 16 in the radial direction of the rotation axis P of the steering shaft 3.

With this, in a case where the torque sensor 12, the first ball bearing 14, the worm gear 8 and the second ball bearing 15 are fixed to the first housing 9 from one direction in this order, since the second ball bearing 15 is fixed to the first housing 9 through the plate 16, increase in size of the second ball bearing 15 can be suppressed. In other words, in a case where the second ball bearing 15 is fixed to the first housing 9 without through the plate 16, the second ball bearing 15 requires the same outside diameter as an outside diameter of the plate 16.

Further, both of the second inner race 151 and the second outer race 153 of the second ball bearing 15 are fixed to the second shaft 32 and the first housing 9 respectively from the both sides in the direction of the rotation axis P of the steering shaft 3. It is therefore possible to retain or support the second shaft 32 with respect to the first housing 9 in the direction of the rotation axis P.

A configuration of the second housing 10 will be explained with reference to FIG. 4.

The second housing 10 has a second housing body 101, a rotary valve accommodating space 102, a fourth shaft accommodating space 103 and a fluid chamber 104.

The second housing body 101 is formed by a first member 101*a* and second member 101*b*.

The first member 101*a* of the second housing body 101 is connected to the first housing 9 with bolts a.

The rotary valve accommodating space 102 is provided at an inner side of the first member 101*a* of the second housing body 101, and accommodates the rotary valve 39.

The fourth shaft accommodating space 103 is provided at inner sides of the first member 101*a* and the second member 101*b* of the second housing body 101, and accommodates the fourth shaft 34.

The fluid chamber 104 is provided at the inner side of the second member 101*b* of the second housing body 101.

The piston 11 provided inside the second member 101*b* of the second housing body 101 and dividing the fluid chamber 104 into a first fluid chamber 5 and a second fluid chamber 6 provides a steering force to the transmission mechanism 4 according to a pressure difference of the working fluid between the first fluid chamber 5 and the second fluid chamber 6.

The rotary valve 39 is configured by the third shaft valve portion 37 provided on an outer peripheral surface of the third shaft 33 and a fourth shaft valve portion 38 provided on an inner peripheral surface of the fourth shaft 34.

The third shaft valve portion 37 is vertical grooves that extend in the direction of the rotation axis P of the steering shaft 3, and fluid supply recesses and fluid discharge recesses are provided so as to be alternately arranged in the circumferential direction of the rotation axis P of the steering shaft 3.

The fourth shaft valve portion 38 is vertical grooves that extend in the direction of the rotation axis P of the steering shaft 3, and right steering recesses and left steering recesses are provided so as to be alternately arranged in the circumferential direction of the rotation axis P of the steering shaft 3.

With this structure, the rotary valve 39 selectively supplies the working fluid, which is supplied from the pump device 402 through the pipe 404, to the first fluid chamber 5 and the second fluid chamber 6 according to torsion of the second torsion bar 36.

The gear mechanism C is the ball-nut type mechanism, and has a ball-nut mechanism 500, the fourth shaft 34 having an outer periphery where a screw groove 503 is formed and the sector gear 406.

The ball-nut mechanism 500 has the piston 11 and a plurality of balls 501.

The piston 11 is tubular in shape, and has a screw groove 504 on an inner periphery of the tubular shape.

A rack 11a is provided on one side surface of an outer periphery of the piston 11.

A ball tube 502 is secured to the other side surface of the outer periphery of the piston 11.

The fourth shaft 34 is inserted into an inner peripheral side of the piston 11. The piston 11 is fitted onto the fourth shaft 34 so as to be able to move relative to the fourth shaft 34 in the axial direction.

The plurality of balls 501 are accommodated between the screw groove 504 of the piston 11 and the screw groove 503 of the fourth shaft 34.

The sector gear 406 meshes with the rack 11a of the piston 11.

When the fourth shaft 34 rotates, the balls 501 roll and move in the grooves 503 and 504, and this moves the piston 11 in the direction of the rotation axis P of the steering shaft 3. The balls 501 circulate in the grooves 503 and 504 through the ball tube 502. When the piston 11 moves in the direction of the rotation axis P of the steering shaft 3, the sector gear 406 rotates, and the movement of the piston 11 is transmitted to the sector shaft 407.

Next, a detailed configuration of the torque sensor 12 will explained with reference to FIGS. 7A, 7B, 8A and 8B.

The torque sensor 12 is configured from the magnet 121, the magnet retaining member 122, the first yoke 123, the second yoke 124, the yoke retaining member 126 and a magnetic sensor 125 (see FIG. 5).

The magnet 121 has an annular shape, and N-pole and S-pole are alternately arranged in the circumferential direction of the rotation axis P of the steering shaft 3. The N-pole and the S-pole could be provided as a pair or a plurality of pairs.

The magnet retaining member 122 is made of metal material, and has a plastic deformation fixing portion 122a and a magnet retaining portion 122b having a plurality of nail portions 122c.

The plastic deformation fixing portion 122a is fixed to the second shaft 32 by plastic deformation (by swaging, pressing or squeezing). The magnet retaining portion 122b retains (or supports) the magnet 121 by the plurality of nail portions 122c.

The first yoke 123 is made of magnetic material, and is provided at the first shaft 31. The first yoke 123 has a first annular portion 123a and a plurality of nail portions 123b.

The plurality of nail portions 123b are provided at the first annular portion 123a. The nail portions 123b are arranged in the circumferential direction of the rotation axis P of the steering shaft 3. Each of the nail portions 123b faces the magnet 121 (see FIG. 8E)

The second yoke 124 is made of magnetic material, and is provided at the first shaft 31. The second yoke 124 has a second annular portion 124a and a plurality of nail portions 124b.

The plurality of nail portions 124b are provided at the second annular portion 124a. The nail portions 124b are arranged such that the nail portion 124b and the nail portion 123b are alternately arranged in the circumferential direction of the rotation axis P of the steering shaft 3. Each of the nail portions 124b faces the magnet 121 (see FIG. 8B).

The magnetic sensor 125 is set between the first annular portion 123a and the second annular portion 124a, and outputs the steering torque signal according to a magnetic field in this setting area of the magnetic sensor 125 (see FIG. 5).

Here, the plastic deformation fixing portion 122a of the magnet retaining member 122 is located so as to overlap the first annular portion 123a and the second annular portion 124a in the direction of the rotation axis P of the steering shaft 3. With this overlapping arrangement, it is possible to suppress increase in axial direction size of the steering device 1.

Next, workings and effects will be explained. The steering device of the embodiment 1 has the following working and effect.

(1) The first housing body 91, having the sensor accommodating space 92 and the reduction gear accommodating space 93 at the inner side thereof, of the first housing 9 has an integral structure formed by a single-piece member by molding.

Therefore, a structure of the first housing 9 can be simplified, and increase in size of the first housing 9 in the direction of the rotation axis P of the steering shaft 3 can be suppressed. That is, in a case where the first housing 9 is formed by two members, bolts, nuts, bolt bosses (flanges), sealing structures, etc. are needed to connect these two members, and this consequently causes increase in size.

(2) The reduction gear fixing portion 321, receiving the rotation force transmitted from the electric motor 7 through the worm gear 8 as the speed reducer (or the reduction gear), of the second shaft 32 is supported by the first ball bearing 14 and the second ball bearing 15 at the both side of the reduction gear fixing portion 321 in the direction of the rotation axis P of the steering shaft 3.

Therefore, it is possible to suppress fall-down or leaning of the second shaft 32 with respect to the first housing 9, and also suppress fall-down or leaning of the third shaft 33 that is connected to the second shaft 32. Further, since the third shaft 33 is provided with the third shaft valve portion 37 that forms the rotary valve 39, an influence on operating characteristics of the rotary valve 39 due to the fall-down of the third shaft 33 can also be suppressed.

(3) The plate 16 is fixed to the first housing 9 at a closer position to the second housing 10 with respect to the worm gear 8 in the direction of the rotation axis P of the steering shaft 3. The first plate 16a and the second plate 16b, which form the plate 16, have the plate second bearing retaining portions 16a1 and 16b1 to retain the second ball bearing 15 respectively. The second ball bearing 15 is provided between the second shaft 32 and the plate 16 in the radial direction of the rotation axis P of the steering shaft 3.

Therefore, in a case where the torque sensor 12, the first ball bearing 14, the worm gear 8 and the second ball bearing 15 are fixed to the first housing 9 from one direction in this order, since the second ball bearing 15 is fixed to the first housing 9 through the plate 16, increase in size of the second ball bearing 15 can be suppressed. In other words, in a case where the second ball bearing 15 is fixed to the first housing 9 without through the plate 16, the second ball bearing 15 requires the same outside diameter as the outside diameter of the plate 16, and consequently, the second ball bearing 15 becomes large.

(4) The plate 16 is fixed to the first housing 9 with the plate 16 being accommodated in the first housing 9.

Therefore, for instance, in a case where the plate 16 is fixed with the plate 16 being sandwiched between the first housing 9 and the second housing 10, seals are needed between the first housing 9 and the plate 16 and between the plate 16 and the second housing 10. In contrast, by accommodating the plate 16 in the first housing 9, the seal between the plate 16 and the first housing 9 is not required, thereby suppressing increase in parts count.

(5) The torque sensor 12, the first ball bearing 14 and the worm gear 8 are arranged in the direction of the rotation axis P of the steering shaft 3 in the order of the torque sensor 12, the first ball bearing 14 and the worm gear 8.

Therefore, the first ball bearing 14 can receive the rotation force inputted to the second shaft 32 from the electric motor 7 through the worm gear 8 at a closer position with respect to the torque sensor 12. It is therefore possible to suppress fall-down or leaning and flexure of the second shaft 32, due to transmission of the rotation force from the electric motor 7, at the second shaft-torque sensor retaining portion 322 where the torque sensor 12 is provided, thereby suppressing decrease in detection accuracy of the torque sensor 12.

(6) The second shaft 32 has the second shaft-torque sensor retaining portion 322 to retain the torque sensor 12 and the second shaft-first bearing retaining portion 323 to retain the first ball bearing 14. The outside diameter, in the radial direction of the rotation axis P of the steering shaft 3, of the second shaft-first bearing retaining portion 323 is formed to be greater than the outside diameter, in the radial direction of the rotation axis P of the steering shaft 3, of the second shaft-torque sensor retaining portion 322.

Therefore, since the first ball bearing 14 has the inside diameter that is greater than the outside diameter of the second shaft-torque sensor retaining portion 322 of the second shaft 32, it is possible to sufficiently secure a capacity of load which the first ball bearing 14 receives.

(7) The plate 16 and the C-ring 17 as the second inner race fixing member are provided, and the plate 16 is fixed to the first housing 9 at a closer position to the second housing 10 with respect to the worm gear 8 in the direction of the rotation axis P of the steering shaft 3. The plate 16 has the plate second bearing retaining portions 16a1 and 16b1 to retain the second ball bearing 15. The second ball bearing 15 has the second inner race 151, the balls 152 and the second outer race 153. The plate second bearing retaining portions 16a1 and 16b1 sandwich the second outer race 153 from both sides in the direct ion of the rotation axis P of the steering shaft 3, then retain the second ball bearing 15. The second shaft 32 has the second shaft-second bearing retaining portion 324 to retain the second ball bearing 15. The second shaft-second bearing retaining portion 324 has the contact surface 324a that contacts one of the pair of end surfaces, in the direction of the rotation axis P of the steering shaft 3, of the second inner race 151. The C-ring 17 contacts the other of the pair of end surfaces, in the direction of the rotation axis P of the steering shaft 3, of the second inner race 151, then fixes the second inner race 151 to the second shaft 32.

Therefore, both of the second inner race 151 and the second outer race 153 of the second ball bearing 15 are fixed to the second shaft 32 and the first housing 9 respectively from the both sides in the direction of the rotation axis P of the steering shaft 3. It is thus possible to retain the second shaft 32 with respect to the first housing 9 in the direction of the rotation axis P.

(8) The second power steering mechanism B is configured such that the worm shaft 81, the electric motor 7, the control unit body-housing 132a and the power supply connector portion 133 are arranged in the direction of the rotation axis Q of the worm shaft 81 in the order of the worm shaft 81, the electric motor 7, the control unit body-housing 132a and the power supply connector portion 133.

Therefore, by arranging these components along the direction of the rotation axis Q of the worm shaft 81 in this way, a protruding amount of the second power steering mechanism B in a radial direction of the rotation axis Q of the worm shaft 81 is suppressed, then mountability of the steering device 1 into a vehicle can be improved.

(9) The plastic deformation fixing portion 122a of the magnet retaining member 122 is located so as to overlap the first annular portion 123a of the first yoke 123 and the second annular portion 124a of the second yoke 124 in the direction of the rotation axis P of the steering shaft 3.

Therefore, it is possible to suppress increase in axial direction size of the steering device 1.

(10) The portion (the second shaft-radial direction hole portion 325, the fixing pin 18b and the first torsion bar radial direction hole portion 352) where the second shaft 32 and the first torsion bar 35 are connected and the second shaft insertion hole portion 331 overlap each other in the direction of the rotation axis P of the steering shaft 3.

Therefore, it is possible to suppress increase in axial direction size of the steering device 1.

(11) Between the outer peripheral surface of the first shaft 31 and the inner peripheral surface of the second shaft 32, the needle bearing 19 and the needle bearing 20 are arranged apart from each other in the direction of the rotation axis P of the steering shaft 3. The first ball bearing 14 is located between the two needle bearings 19 and 20.

Therefore, the first shaft 31 and the second shaft 32 can be supported with respect to the first housing 9 with a good balance.

(12) The worm shaft 81 is arranged so as not to interfere with the working fluid supply port 105 and the working fluid discharge port 106.

Therefore, it is possible to improve workability of connecting work for connecting the working fluid supply pipe 21 and the working fluid discharge pipe 22 to the working fluid supply port 105 and the working fluid discharge port 106 respectively.

(13) The electric motor 7, the working fluid supply pipe 21 and the working fluid discharge pipe 22 are located so as to protrude to the same side with respect to the axis S connecting the meshing portion of the worm shaft 81 with the worm wheel 82 and the steering shaft 3 in the circumferential direction of the rotation axis P of the steering shaft 3.

Therefore, it is possible to suppress expansion of an occupied area of the whole steering device with respect to the vehicle.

(14) The worm shaft 81 is provided at a position that is offset from the working fluid supply port 105 and the working fluid discharge port 106 in the circumferential direction of the rotation axis P of the steering shaft 3.

Therefore, the worm shaft 81 can be prevented from interfering with the working fluid supply port 105 and the working fluid discharge port 106.

(15) The worm shaft 81 meshes with the worm wheel 82 such that the rotation axis Q of the worm shaft 81 inclines with respect to the plane perpendicular to the rotation axis P of the worm wheel 82 (which is the same as the rotation axis P of the steering shaft 3).

Therefore, by this oblique arrangement of the worm shaft 81, a layout in which the worm shaft 81 can be prevented from interfering with the working fluid supply port 105 and the working fluid discharge port 106 can be easily employed.

Embodiment 2

Figure 9:
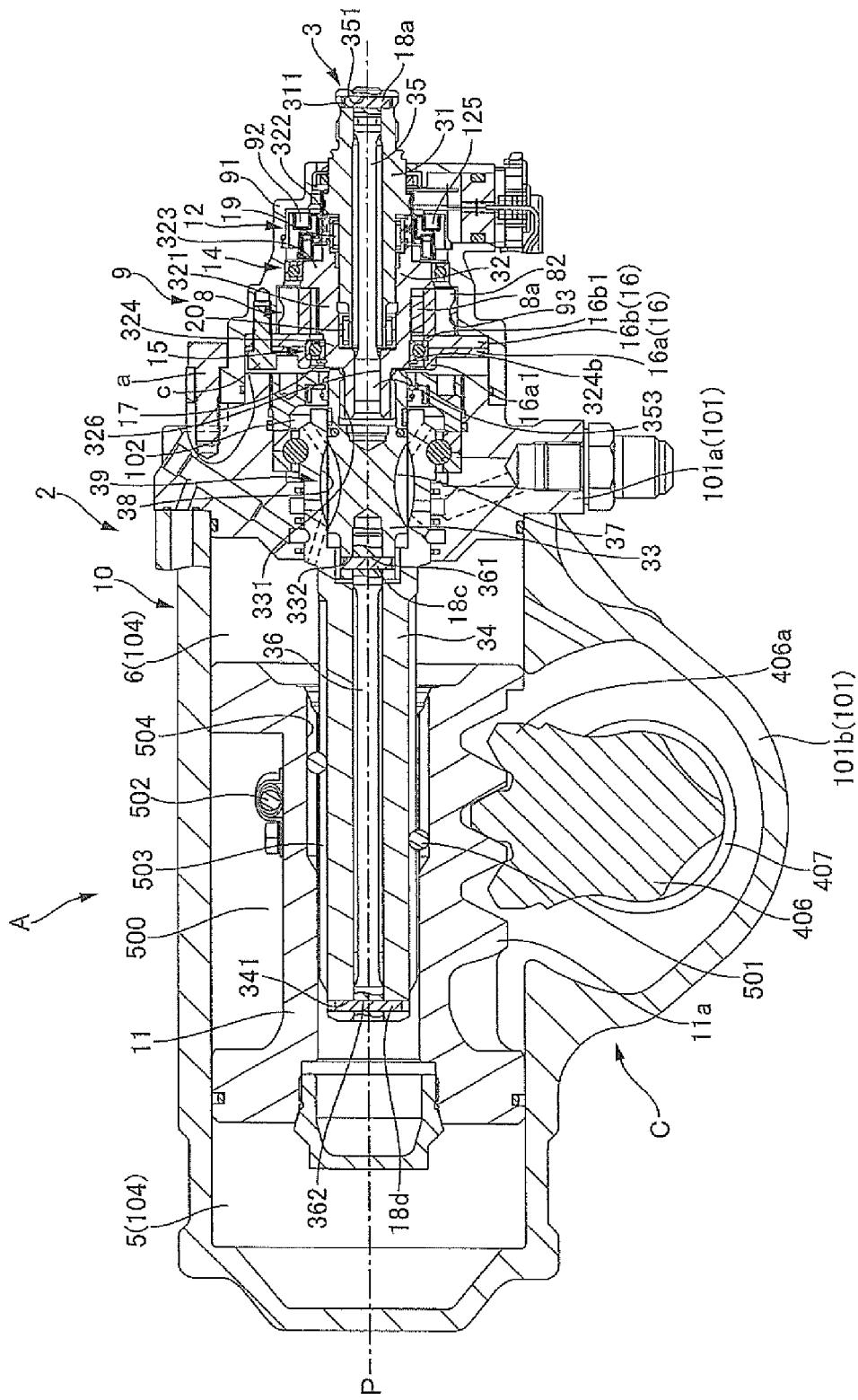
FIG. 9 is a sectional view of the first power steering mechanism A according to an embodiment 2 of the present invention.

FIG. 9 is a sectional view of the first power steering mechanism A according to an embodiment 2

Unlike the embodiment 1, the first torsion bar 35 and the second shaft 32 are connected by press fitting.

That is, as shown in FIG. 9, the first torsion bar 35 and the second shaft 32 are connected by press-fitting one end portion 353, as a second shaft connecting portion formed at one end portion (in a left direction in FIG. 9) in the direction of the rotation axis P of the steering shaft 3, of the first torsion bar 35 into a hole portion 326, as a first torsion bar connecting portion formed at one end portion (in the left direction in FIG. 9) in the direction of the rotation axis P of the steering shaft 3, of the second shaft 32.

The other structures or configurations are the same as those of the embodiment 1. Components, portions, etc. that are common to the embodiment 1 are denoted by the same reference signs, and their explanations are omitted here.

Next, workings and effects will be explained.

The steering device of the embodiment 2 has the same workings and effects as those of the embodiment 1.

Other Embodiment

Although the embodiments for carrying out the present invention have been explained above, the present invention is not limited to the above embodiments, but includes all design modifications and equivalents belonging to the technical scope of the present invention.

For instance, the gear mechanism in the steering mechanism may be a rack-and-pinion-type steering having a pinion that is provided integrally with the output shaft and a rack that meshes with the pinion. In this case, the transmission mechanism is a rack bar, a pinion shaft, etc.

Technical ideas that can be understood from the embodiments described above are the following.

As one aspect of the present invention, a steering device comprises: a steering mechanism having a steering shaft and a transmission mechanism, wherein the steering shaft has a first shaft, a second shaft, a third shaft, a fourth shaft, a first torsion bar and a second torsion bar, the first shaft and the second shaft are connected to each other through the first torsion bar, the first shaft can be rotated according to driver's steering operation, the third shaft is connected to the second shaft, the third shaft and the fourth shaft are connected to each other through the second torsion bar, the third shaft has a third shaft valve portion, the fourth shaft has a fourth shaft valve portion, forms a rotary valve together with the third shaft, and can selectively supply working fluid, which is externally supplied, to a first fluid chamber and a second fluid chamber according to torsion of the second torsion bar, and the transmission mechanism transmits rotation of the fourth shaft to steered wheels; an electric motor having an electric motor output shaft and being able to rotate according to a motor command signal generated on the basis of a steering torque signal; a reduction gear provided between the electric motor output shaft and the second shaft and transmitting a rotation force of the electric motor to the second shaft; a first housing having a first housing body, a sensor accommodating space and a reduction gear accommodating space, wherein the first housing body is formed as a single-piece member by molding, the sensor accommodating space is provided at an inner side of the first housing body, and the reduction gear accommodating space is provided at the inner side of the first housing body, and accommodates the reduction gear; a second housing having a second housing body, a rotary valve accommodating space, a fourth shaft accommodating space and a fluid chamber, wherein the second housing body is connected to the first housing, the rotary valve accommodating space is provided at an inner side of the second housing body, and accommodates the rotary valve, the fourth shaft accommodating space is provided at the inner side of the second housing body, and accommodates the fourth shaft, and the fluid chamber is provided at the inner side of the second housing body; a piston provided inside the second housing, dividing the fluid chamber into the first fluid chamber and the second fluid chamber and providing a steering force to the transmission mechanism according to a pressure difference of the working fluid between the first fluid chamber and the second fluid chamber; a torque sensor provided in the sensor accommodating space, detecting a steering torque generated at the steering mechanism according to a torsion amount of the first torsion bar and outputting the steering torque signal; and a control unit including a microprocessor, wherein the microprocessor is configured to generate the motor command signal on the basis of the steering torque signal.

As a preferable steering device, in the above aspect, the steering device further comprises: a first bearing and a second bearing, wherein the first bearing is provided at the first housing, and supports the second shaft with respect to the first housing, the second bearing is provided at the first housing, is spaced apart from the first bearing in a direction of a rotation axis of the steering shaft, and supports the second shaft with respect to the first housing, the second shaft has a reduction gear fixing portion, the reduction gear fixing portion is located between the first bearing and the second bearing in the direction of the rotation axis of the steering shaft, and the reduction gear is fixed to the reduction gear fixing portion.

As a preferable steering device, in the above aspect, the steering device further comprises: a plate, wherein the plate is fixed to the first housing at a closer position to the second housing with respect to the reduction gear in the direction of the rotation axis of the steering shaft, and the plate has a plate second bearing retaining portion to retain the second bearing, and the second bearing is provided between the second shaft and the plate in a radial direction of the rotation axis of the steering shaft.

As a preferable steering device, in the above aspect, the plate is fixed to the first housing with the plate being accommodated in the first housing.

As another preferable steering device, in any aspect of the above, the torque sensor, the first bearing and the reduction gear are arranged in the direction of the rotation axis of the steering shaft in an order of the torque sensor, the first bearing and the reduction gear.

As another preferable steering device, in any aspect of the above, the second shaft has a second shaft-torque sensor retaining portion to retain the torque sensor and a second shaft-first bearing retaining portion to retain the first bearing, and an outside diameter, in the direction of the rotation axis of the steering shaft, of the second shaft-first bearing retaining portion is greater than an outside diameter, in the direction of the rotation axis of the steering shaft, of the second shaft-torque sensor retaining portion.

As another preferable steering device, in any aspect of the above, the steering device further comprises: a plate and a second inner race fixing member, wherein the plate is fixed to the first housing at a closer position to the second housing with respect to the reduction gear in the direction of the rotation axis of the steering shaft, and the plate has plate second bearing retaining portions to retain the second bearing, the second bearing is a ball bearing having a second inner race, balls and a second outer race, the plate second bearing retaining portions retains the second bearing by sandwiching the second outer race from both sides in the direction of the rotation axis of the steering shaft, the second shaft has a second shaft-second bearing retaining portion to retain the second bearing, the second shaft-second bearing retaining portion has a contact surface that contacts one of a pair of end surfaces, in the direction of the rotation axis of the steering shaft, of the second inner race, and the second inner race fixing member fixes the second inner race to the second shaft by contacting the other of the pair of end surfaces, in the direction of the rotation axis of the steering shaft, of the second inner race.

As another preferable steering device, in any aspect of the above, the reduction gear is a worm gear having a worm shaft and a worm wheel, the worm shaft is connected to the electric motor output shaft, the worm wheel is provided at the second shaft, the control unit has a control unit body and a power supply connector portion, the control unit body includes a control unit body-housing accommodating therein the microprocessor, and the worm shaft, the electric motor, the control unit body-housing and the power supply connector portion are arranged in a direction of a rotation axis of the worm shaft in an order of the worm shaft, the electric motor, the control unit body-housing and the power supply connector portion.

As another preferable steering device, in any aspect of the above, the torque sensor includes a magnet, a magnet retaining member, a first yoke, a second yoke and a magnetic sensor, the magnet has an annular shape where N-pole and S-pole are alternately arranged in a circumferential direction of the rotation axis of the steering shaft, the magnet retaining member is made of metal material, and has a plastic deformation fixing portion and a magnet retaining portion, the plastic deformation fixing portion is fixed to the second shaft by plastic deformation, the magnet retaining portion retains the magnet, the first yoke is made of magnetic material, is provided at the first shaft, and has a first annular port ion and a plurality of first nail portions, the plurality of first nail portions are provided at the first annular portion, and are arranged in the circumferential direction of the rotation axis of the steering shaft with each first nail portion facing the magnet, the second yoke is made of magnetic material, is provided at the first shaft, and has a second annular portion and a plurality of second nail portions, the plurality of second nail portions are provided at the second annular portion, and are arranged such that the second nail portions and the first nail portion are alternately arranged in the circumferential direction of the rotation axis of the steering shaft with each second nail portion facing the magnet, the magnetic sensor is set between the first annular portion and the second annular portion, and outputs a signal according to a magnetic field in a setting area of the magnetic sensor, and the plastic deformation fixing portion overlaps the first annular portion and the second annular portion in a direction of a rotation axis of the steering shaft.

As another preferable steering device, in any aspect of the above, the first torsion bar has, at one end portion thereof in a direction of a rotation axis of the steering shaft, a second shaft connecting portion, the second shaft has, at one end portion thereof in the direction of the rotation axis of the steering shaft, a first torsion bar connecting portion, the first torsion bar and the second shaft are connected by the second shaft connecting portion of the first torsion bar and the first torsion bar connecting portion of the second shaft, the third shaft has a second shaft insertion hole portion opening toward the second shaft in the direction of the rotation axis of the steering shaft, the second shaft is connected to the third shaft with the second shaft being inserted into the second shaft insertion hole portion, and the second shaft connecting portion of the first torsion bar and the first torsion bar connecting portion of the second shaft overlap the second shaft insertion hole portion in the direction of the rotation axis of the steering shaft.

As another preferable steering device, in any aspect of the above, the steering device as claimed in claim 1, further comprises: a first bearing, a second bearing, a third bearing and a fourth bearing, wherein the first bearing and the second bearing are provided at the first housing, support the second shaft with respect to the first housing, and are spaced apart from each other in a direction of a rotation axis of the steering shaft, the third bearing and the fourth bearing are provided between the first shaft and the second shaft in a radial direction of the rotation axis of the steering shaft, and are spaced apart from each other in the direction of the rotation axis of the steering shaft, and the first bearing is located between the third bearing and the fourth bearing in the direction of the rotation axis of the steering shaft.

As another preferable steering device, in any aspect of the above, the second housing has a working fluid supply port and a working fluid discharge port, the working fluid supply port is structured such that a working fluid supply pipe for supplying the working fluid to the rotary valve can be connected to the working fluid supply port, the working fluid discharge port is structured such that a working fluid discharge pipe for discharging the working fluid, which is discharged from the rotary valve, to an outside of the second housing can be connected to the working fluid discharge port, the reduction gear is a worm gear having a worm shaft and a worm wheel, the worm shaft is connected to the electric motor output shaft, the worm wheel is provided at the second shaft, and the worm shaft is provided so as not to interfere with the working fluid supply port and the working fluid discharge port.

As a preferable steering device, in the above aspect, the working fluid supply port and the working fluid discharge port are provided at the same side as the electric motor with respect to an axis that connects a meshing portion of the worm shaft with the worm wheel and the steering shaft on a plane orthogonal to a rotation axis of the steering shaft.

As a preferable steering device, in the above aspect, the worm shaft is provided at a position that is offset from the working fluid supply port and the working fluid discharge port in a circumferential direction of the rotation axis of the steering shaft.

As another preferable steering device, in any aspect of the above, the worm shaft meshes with the worm wheel such that a rotation axis of the worm shaft inclines with respect to a plane perpendicular to a rotation axis of the worm wheel.

EXPLANATION OF REFERENCE

1 . . . steering device, 2 . . . steering mechanism, 3 . . . steering shaft (steering mechanism), 31 . . . first shaft (steering shaft), 32 . . . second shaft (steering shaft), 321 . . . reduction gear fixing portion, 322 . . . second shaft-torque sensor retaining port ion, 323 . . . second shaft-first bearing retaining portion, 324 . . . second shaft-second bearing retaining portion, 324*a* . . . contact surface (second shaft-second bearing retaining portion), 325 . . . second shaft-radial direction hole portion (first torsion bar connecting portion), 326 . . . hole portion (first torsion bar connecting portion), 33 . . . third shaft (steering shaft), 331 . . . second shaft insertion hole portion, 34 . . . fourth shaft (steering shaft), 35 . . . first torsion bar, 352 . . . first torsion bar radial direction hole portion (second shaft connecting portion), 353 . . . one end portion of first torsion bar (second shaft connecting portion), 36 . . . second torsion bar, 37 . . . third shaft valve portion, 38 . . . fourth shaft valve portion, 39 . . . rotary valve, 4 . . . transmission mechanism (steering mechanism), 412 . . . steered wheel, 5 . . . first fluid chamber (fluid chamber), 6 . . . second fluid chamber (fluid chamber), 7 . . . electric motor, 71 . . . electric motor output shaft, 8 . . . worm gear 8 (reduction gear, 81 . . . worm shaft (worm gear), 82 . . . worm wheel (worm gear), 9 . . . first housing, 91 . . . first housing body (first housing), 92 . . . sensor accommodating space (first housing), 93 . . . reduction gear accommodating space (first housing), 10 . . . second housing, 101 . . . second housing body (second housing), 101*a* . . . first member (second housing body), 101*b* . . . second member (second housing body), 102 . . . rotary valve accommodating space (second housing), 103 . . . fourth shaft accommodating space (second housing), 104 . . . fluid chamber 105 . . . working fluid supply port, 106 . . . working fluid discharge port, 11 . . . piston, 12 . . . torque sensor, 121 . . . magnet, 122 . . . magnet retaining member, 122*a* . . . plastic deformation fixing portion, 122*b* . . . magnet retaining portion, 123 . . . first yoke, 123*a* . . . first annular portion, 123*b* . . . first nail portion, 124 . . . second yoke, 124*a* . . . second annular portion, 124*b* . . . second nail portion, 125 . . . magnetic sensor, 13 . . . control unit, 131 . . . microprocessor, 132 . . . control unit body, 132*a* . . . control unit body-housing, 133 . . . power supply connector portion, 14 . . . first ball bearing (first bearing), 141 . . . first inner race, 142 . . . ball 143 . . . first outer race, 15 . . . second ball bearing (second bearing), 151 . . . second inner race, 152 . . . ball 153 . . . second outer race, 16 . . . plate, 16*a* . . . first plate, 16*a*1 . . . plate second bearing retaining portion, 16*b* . . . second plate, 16*b*1 . . . plate second bearing retaining portion, 17 . . . C-ring (second inner race fixing member), 18*a* . . . fixing pin, 18*b* . . . fixing pin, 18*c* . . . fixing pin, 18*d* . . . fixing pin, 19 . . . needle bearing (third bearing), 20 . . . needle bearing (fourth bearing), P . . . rotation axis of steering shaft, Q . . . rotation axis of worm shaft, S . . . axis connecting meshing portion of worm shaft with worm wheel and steering shaft, R . . . circumferential direction of rotation axis of steering shaft

The invention claimed is:

1. A steering device comprising:
   a steering mechanism having a steering shaft and a transmission mechanism, wherein
   the steering shaft has a first shaft, a second shaft, a third shaft, a fourth shaft, a first torsion bar and a second torsion bar,
   the first shaft and the second shaft are connected to each other through the first torsion bar,
   the first shaft can be rotated according to driver's steering operation,
   the third shaft is connected to the second shaft,
   the third shaft and the fourth shaft are connected to each other through the second torsion bar,
   the third shaft has a third shaft valve portion,
   the fourth shaft has a fourth shaft valve portion, forms a rotary valve together with the third shaft, and can selectively supply working fluid, which is externally supplied, to a first fluid chamber and a second fluid chamber according to torsion of the second torsion bar, and
   the transmission mechanism transmits rotation of the fourth shaft to steered wheels;
   an electric motor having an electric motor output shaft and being able to rotate according to a motor command signal generated on the basis of a steering torque signal;
   a reduction gear provided between the electric motor output shaft and the second shaft and transmitting a rotation force of the electric motor to the second shaft;
   a first housing having a first housing body, a sensor accommodating space and a reduction gear accommodating space, wherein
      the first housing body is formed as a single-piece member by molding,
      the sensor accommodating space is provided at an inner side of the first housing body, and
      the reduction gear accommodating space is provided at the inner side of the first housing body, and accommodates the reduction gear;
   a second housing having a second housing body, a rotary valve accommodating space, a fourth shaft accommodating space and a fluid chamber, wherein
      the second housing body is connected to the first housing,
      the rotary valve accommodating space is provided at an inner side of the second housing body, and accommodates the rotary valve,
      the fourth shaft accommodating space is provided at the inner side of the second housing body, and accommodates the fourth shaft, and
      the fluid chamber is provided at the inner side of the second housing body;
   a piston provided inside the second housing, dividing the fluid chamber into the first fluid chamber and the second fluid chamber and providing a steering force to the transmission mechanism according to a pressure difference of the working fluid between the first fluid chamber and the second fluid chamber;
   a torque sensor provided in the sensor accommodating space, detecting a steering torque generated at the steering mechanism according to a torsion amount of the first torsion bar and outputting the steering torque signal; and
   a control unit including a microprocessor, wherein
      the microprocessor is configured to generate the motor command signal on the basis of the steering torque signal.

2. The steering device as claimed in claim 1, further comprising:
   a first bearing and a second bearing, wherein
      the first bearing is provided at the first housing, and supports the second shaft with respect to the first housing,
      the second bearing is provided at the first housing, is spaced apart from the first bearing in a direction of a rotation axis of the steering shaft, and supports the second shaft with respect to the first housing,
      the second shaft has a reduction gear fixing portion,
      the reduction gear fixing portion is located between the first bearing and the second bearing in the direction of the rotation axis of the steering shaft, and
      the reduction gear is fixed to the reduction gear fixing portion.

3. The steering device as claimed in claim 2, further comprising:

a plate, wherein
the plate is fixed to the first housing at a closer position to the second housing with respect to the reduction gear in the direction of the rotation axis of the steering shaft, and the plate has a plate second bearing retaining portion to retain the second bearing, and
the second bearing is provided between the second shaft and the plate in a radial direction of the rotation axis of the steering shaft.

4. The steering device as claimed in claim 3, wherein
the plate is fixed to the first housing with the plate being accommodated in the first housing.

5. The steering device as claimed in claim 2, wherein
the torque sensor, the first bearing and the reduction gear are arranged in the direction of the rotation axis of the steering shaft in an order of the torque sensor, the first bearing and the reduction gear.

6. The steering device as claimed in claim 5, wherein
the second shaft has a second shaft-torque sensor retaining portion to retain the torque sensor and a second shaft-first bearing retaining portion to retain the first bearing, and
an outside diameter, in the direction of the rotation axis of the steering shaft, of the second shaft-first bearing retaining portion is greater than an outside diameter, in the direction of the rotation axis of the steering shaft, of the second shaft-torque sensor retaining portion.

7. The steering device as claimed in claim 2, further comprising:
a plate and a second inner race fixing member, wherein
the plate is fixed to the first housing at a closer position to the second housing with respect to the reduction gear in the direction of the rotation axis of the steering shaft, and the plate has plate second bearing retaining portions to retain the second bearing,
the second bearing is a ball bearing having a second inner race, balls and a second outer race,
the plate second bearing retaining portions retains the second bearing by sandwiching the second outer race from both sides in the direction of the rotation axis of the steering shaft,
the second shaft has a second shaft-second bearing retaining portion to retain the second bearing,
the second shaft-second bearing retaining portion has a contact surface that contacts one of a pair of end surfaces, in the direction of the rotation axis of the steering shaft, of the second inner race, and
the second inner race fixing member fixes the second inner race to the second shaft by contacting the other of the pair of end surfaces, in the direction of the rotation axis of the steering shaft, of the second inner race.

8. The steering device as claimed in claim 1, wherein
the reduction gear is a worm gear having a worm shaft and a worm wheel,
the worm shaft is connected to the electric motor output shaft,
the worm wheel is provided at the second shaft,
the control unit has a control unit body and a power supply connector portion,
the control unit body includes a control unit body-housing accommodating therein the microprocessor, and
the worm shaft, the electric motor, the control unit body-housing and the power supply connector portion are arranged in a direction of a rotation axis of the worm shaft in an order of the worm shaft, the electric motor, the control unit body-housing and the power supply connector portion.

9. The steering device as claimed in claim 1, wherein
the torque sensor includes a magnet, a magnet retaining member, a first yoke, a second yoke and a magnetic sensor,
the magnet has an annular shape where N-pole and S-pole are alternately arranged in a circumferential direction of the rotation axis of the steering shaft,
the magnet retaining member is made of metal material, and has a plastic deformation fixing portion and a magnet retaining portion,
the plastic deformation fixing portion is fixed to the second shaft by plastic deformation,
the magnet retaining portion retains the magnet,
the first yoke is made of magnetic material, is provided at the first shaft, and has a first annular portion and a plurality of first nail portions,
the plurality of first nail portions are provided at the first annular portion, and are arranged in the circumferential direction of the rotation axis of the steering shaft with each first nail portion facing the magnet,
the second yoke is made of magnetic material, is provided at the first shaft, and has a second annular portion and a plurality of second nail portions,
the plurality of second nail portions are provided at the second annular portion, and are arranged such that the second nail portions and the first nail portion are alternately arranged in the circumferential direction of the rotation axis of the steering shaft with each second nail portion facing the magnet,
the magnetic sensor is set between the first annular portion and the second annular portion, and outputs a signal according to a magnetic field in a setting area of the magnetic sensor, and
the plastic deformation fixing portion overlaps the first annular port ion and the second annular portion in a direction of a rotation axis of the steering shaft.

10. The steering device as claimed in claim 1, wherein
the first torsion bar has, at one end portion thereof in a direction of a rotation axis of the steering shaft, a second shaft connecting portion,
the second shaft has, at one end portion thereof in the direction of the rotation axis of the steering shaft, a first torsion bar connecting portion,
the first torsion bar and the second shaft are connected by the second shaft connecting portion of the first torsion bar and the first torsion bar connecting portion of the second shaft,
the third shaft has a second shaft insertion hole portion opening toward the second shaft in the direction of the rotation axis of the steering shaft,
the second shaft is connected to the third shaft with the second shaft being inserted into the second shaft insertion hole portion, and
the second shaft connecting portion of the first torsion bar and the first torsion bar connecting portion of the second shaft overlap the second shaft insertion hole portion in the direction of the rotation axis of the steering shaft.

11. The steering device as claimed in claim 1, further comprising:
a first bearing, a second bearing, a third bearing and a fourth bearing, wherein
the first bearing and the second bearing are provided at the first housing, support the second shaft with respect to the first housing, and are spaced apart from each other in a direction of a rotation axis of the steering shaft, the third bearing and the fourth bearing are provided between the first shaft and the second shaft in a radial direction of the rotation axis of the steering shaft, and are spaced apart from each other in the direction of the rotation axis of the steering shaft, and the first bearing is located between the third bearing and the fourth bearing in the direction of the rotation axis of the steering shaft.

12. The steering device as claimed in claim 1, wherein the second housing has a working fluid supply port and a working fluid discharge port, the working fluid supply port is structured such that a working fluid supply pipe for supplying the working fluid to the rotary valve can be connected to the working fluid supply port, the working fluid discharge port is structured such that a working fluid discharge pipe for discharging the working fluid, which is discharged from the rotary valve, to an outside of the second housing can be connected to the working fluid discharge port, the reduction gear is a worm gear having a worm shaft and a worm wheel, the worm shaft is connected to the electric motor output shaft, the worm wheel is provided at the second shaft, and the worm shaft is provided so as not to interfere with the working fluid supply port and the working fluid discharge port.

13. The steering device as claimed in claim 12, wherein the working fluid supply port and the working fluid discharge port are provided at the same side as the electric motor with respect to an axis that connects a meshing portion of the worm shaft with the worm wheel and the steering shaft on a plane orthogonal to a rotation axis of the steering shaft.

14. The steering device as claimed in claim 13, wherein the worm shaft is provided at a position that is off set from the working fluid supply port and the working fluid discharge port in a circumferential direction of the rotation axis of the steering shaft.

15. The steering device as claimed in claim 13, wherein the worm shaft meshes with the worm wheel such that a rotation axis of the worm shaft inclines with respect to a plane perpendicular to a rotation axis of the worm wheel.

* * * * *